(12) United States Patent
Fang

(10) Patent No.: US 7,893,947 B2
(45) Date of Patent: Feb. 22, 2011

(54) METHOD FOR EXTRACTING EDGE IN PHOTOGRAMMETRY WITH SUBPIXEL ACCURACY

(75) Inventor: Xin Fang, Beijing (CN)

(73) Assignee: Beijing Union University, Beijing (CN)

( * ) Notice: Subject to any disclaimer, the term of this patent is extended or adjusted under 35 U.S.C. 154(b) by 668 days.

(21) Appl. No.: 11/880,903

(22) Filed: Jul. 26, 2007

(65) Prior Publication Data

US 2008/0030521 A1 Feb. 7, 2008

(30) Foreign Application Priority Data

Aug. 3, 2006 (CN) .................. 2006 1 0109242

(51) Int. Cl.
  G06T 11/20 (2006.01)
  G09G 5/00 (2006.01)
  G09G 5/02 (2006.01)
  G06K 9/40 (2006.01)
  G06K 9/32 (2006.01)
  H04N 1/46 (2006.01)

(52) U.S. Cl. ............... 345/613; 345/421; 345/428; 345/610; 345/611; 358/525; 382/254; 382/266; 382/269; 382/300

(58) Field of Classification Search ......... 345/418–421, 345/428, 581, 606, 610–611, 613, 616, 442, 345/469; 348/538, 578; 358/1.9, 525, 447–448; 382/254, 266, 267, 269, 274, 276, 300

See application file for complete search history.

(56) References Cited

U.S. PATENT DOCUMENTS 6,064,759 A * 5/2000 Buckley et al. ............ 382/154
7,667,833 B1 * 2/2010 Diver ........................ 356/138
2002/0094134 A1 * 7/2002 Nafis et al. ................. 382/285
2003/0169455 A1 * 9/2003 Takahashi et al. .......... 358/3.03
2005/0069195 A1   3/2005 Uezono et al.
2005/0093894 A1 * 5/2005 Tretter et al. ............... 345/694

FOREIGN PATENT DOCUMENTS

| CN | 1300360    | 6/2001  |
| CN | 1300360 A  | 6/2001  |
| CN | 1529509    | 9/2004  |
| CN | 1529509 A  | 9/2004  |
| CN | 1603740    | 4/2005  |
| CN | 1603740 A  | 4/2005  |
| CN | 1710380    | 12/2005 |
| CN | 1710380 A  | 12/2005 |
| JP | 2006-125896   | 5/2006  |
| JP | 2006-125896 A | 5/2006  |
| WO | WO99/60332    | 11/1999 |

* cited by examiner

Primary Examiner—Wesner Sajous
(74) Attorney, Agent, or Firm—Pedersen and Company, PLLC; Ken J. Pedersen; Barbara S. Pedersen

(57) ABSTRACT

A method for extracting edge with subpixel accuracy in photogrammetry, comprising steps of: a. capturing into a computer a picture, of which the edge is to be extracted; b. defining as a cell four neighboring pixels that form a square; c. recognizing the type of each cell composed of the four pixels; d. finding out side or sides of the cell that intersect with, the edge and figuring out the subpixel accuracy coordinates of the intersection points by linear interpolation; and e. connecting the intersection points to extract the edge. By this method edge curve is extracted rapidly and accurately. The edge determined in this way can be subpixel accurate.

4 Claims, 2 Drawing Sheets

METHOD FOR EXTRACTING EDGE IN PHOTOGRAMMETRY WITH SUBPIXEL ACCURACY

CROSS-REFERENCE TO RELATED APPLICATIONS

The present invention claims the benefit of the copending Chinese application No. 200610109242.X of the same inventor, which is applied by Beijing United University on 3 Aug. 2006.

FIELD OF THE INVENTION

The present invention relates to a method in photogrammetry and for extracting edge with subpixel accuracy, and particularly to a method for extracting a part edge obtained in applying industrial CT (ICT, Industrial Computerized tomography).

BACKGROUND OF THE INVENTION

In the field of photogrammetry, it is often needed to determine part edge in carrying out non-contact or non-destructive measurement of the part; and it is needed in picture search to extract the edge pixels of an image.

A measure method, that is to scan object cross-section layer by layer along one direction using computerized tomography, to obtain a series of slices is also called "cross-sectional measurement". Through extracting the cross-sectional contour of the object by means of the cross-sectional images, 3D reverse and reconstruction of the object could be achieved. Through a picture obtained by industrial CT or the like, the contour of the sectional entity could be transferred into a STL file, which is commonly used in rapid prototyping system, to immediately obtain the 3D model; or the contour of the sectional entity could be transferred into codes for NC machining, to machine a 3D part directly. A critical step during this process is to extract entity edge from the picture.

It has been found after search that edge extractions previously were all based on a single pixel, such as in CN 1711559A (Seiko Epson Corp), wherein the accuracy was no higher than the pixel accuracy and the processing speed is low.

SUMMARY OF THE INVENTION

An object of the present invention is to provide an extraction method wherein the position of the edge could have subpixel accuracy;

Another object of the present invention is to provide an easy and rapid edge extraction method;

Still another object of the present invention is to provide an extraction method which by means of cells is used to extract contour curves and the coordinates of each point on it.

For the above purpose, a solution is proposed as follows:

a method for extraction of edge with subpixel accuracy and used in photogrammetry, comprising the steps of:

a. capturing into a computer a picture, of which edges is to be extracted;

b. defining four neighboring pixels which form a square as one cell;

c. recognizing the type of each cell composed of the four pixels;

d. finding out side or sides of a cell that intersects with a part edge, and determining the subpixel accuracy coordinates of the intersection points by linear interpolation; and e. connecting the intersection points, to extract the part edge.

In the cell defined in the step b, each pixel is compared with a threshold s, if the pixel is smaller than the threshold s, the pixel is a background pixel; and if the pixel is bigger than or equal to the threshold s, the pixel is a part pixel;

In step c, determination regarding to which one of 16 situations each cell belongs to is made, thereby to determine the relationship between the edge and the cell;

In step d, according to the relationship between the edge and the cell determined in the step c, determination regarding to the intersection side of the cell with the edge is made, thereby to determine the coordinates of the intersection points.

The present invention proposes an edge extraction method (cell extraction method), which is more rapid and accurate than the pixel accuracy edge detection operator. By said method, position of the edge could be determined with subpixel accuracy, much higher than pixel accuracy. The speed of edge extracting is substantially raised due to its simple algorithm and four-pixels-as-one-cell.

DESCRIPTION OF THE EMBODIMENTS

The method according to the present invention is mainly directed for the edge detection of an image. The present invention is now detailed described in conjunction with the drawings.

Figure 1:
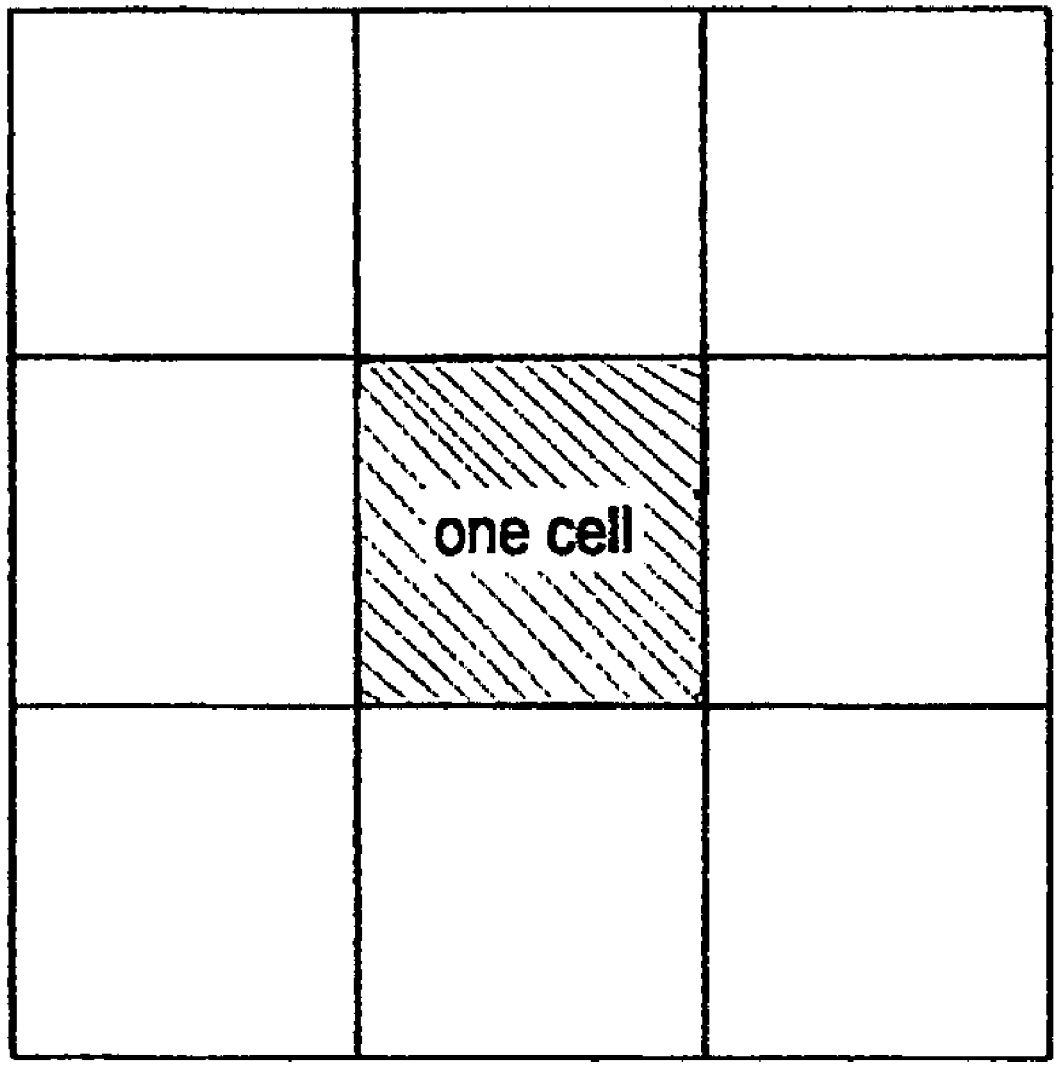
FIG. 1 is a schematic view of a cell according to the present invention.

At first, a "cell" is defined by four pixels that neighbor to each other and form a square. FIG. 1 is a schematic view of a cell according to the present invention. The method for edge extraction with subpixel accuracy according to the present invention is also called "cell extraction method", which fundamentally handles with the square composed of four neighboring pixels, known as cell, instead of a single pixel, as shown by the hatched area in FIG. 1. FIG. 1 shows an image of 4×4 pixels including 3×3 cells. The pixels are connected by vertical and longitudinal lines, whose intersection points represent the pixels.

There are two kind of relationships between a pixel and a threshold s: one is that the pixel is smaller than the threshold s, the other is that the pixel is bigger than or equal to the threshold s. If the pixel is smaller than the threshold s, the pixel is defined as a background pixel, marked as "part-external"; otherwise, it is defined as a part pixel, marked as "part-internal". Each cell has four sides, and each side has two pixels. If both pixels on one side are part-external or part-internal, then the edge of the part does not pass through said side; and if one pixel on one side is part-internal and the other on the same side is part-external, then the edge of the part passes through said side. At the latter situation, the coordinates of the intersection point of the edge and said side can be achieved through linear interpolation, thereby to determine the position of this intersection on the edge.

Figure 2:
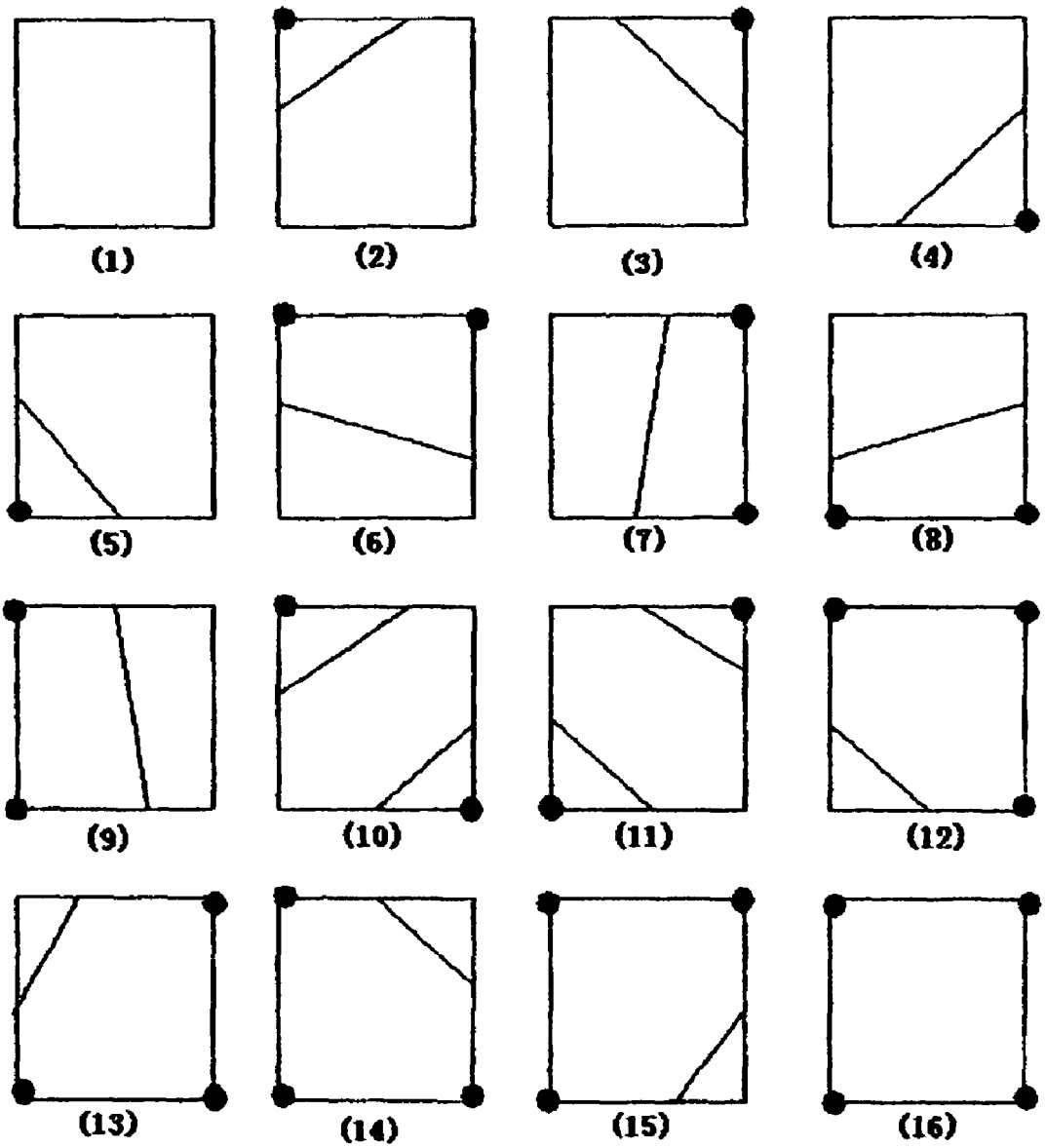
FIG. 2 is a diagrams illustrating the sixteen relationships between the cell and a threshold.

As a cell has only 4 pixels, there could be only 16 relationships between a cell and a threshold s, which are showed as (1)-(16) in FIG. 2. In FIG. 2, the corners (angles of a square)

marked by solid points are part pixels, the corners without marks are background pixels, and the connecting lines between the sides of a cell (connecting lines in squares) shows how the edge passes the said cell.

Firstly a judge has to be made regarding to which one of 16 relationship the cell composed of the four pixels belongs to, then finding out the intersection line of the edge, which followed by calculating the accurate subpixel accuracy coordinates of the intersection point through linear interpolation, and finally acquire the connected relationship between the points of the edge.

Specifically, the subpixel accuracy edge extraction method in photogrammetry using "cell extraction method" comprises the steps of: first, capturing into a computer data of an image that is described by pixel matrix; defining four neighboring pixels forming a square in the image as one cell; comparing each pixel in a cell with a threshold s as to determine which one of 16 types the cell composed of the four pixels belongs to; finding out the intersection line of the edge with the cell according to the type, and calculating the accurate subpixel accuracy coordinates of the intersection points of said intersection line with the four sides of the cell by linear interpolation; connecting the resultant intersection points, thereby to extract the edge.

In comparing the pixels with the threshold s, each pixel is compared with the threshold s, if a pixel is smaller than the threshold s, the pixel is a background pixel; and if a pixel is bigger than or equal to the threshold s, the pixel is a part pixel.

In conjunction with technologies in the prio art it is easy for the persons skilled in the art to carry out the comparation with the threshold, the calculation of the coordinates of the intersection points of the edge with the cell sides through linear interpolation, and the determination of which one of 16 types the cell belongs to, which are used in the solution of the present invention, and thus will not be explained in detail.

The above detailed description offers an exemplary description of the practicable embodiments of the present invention, but not intended to limit the scope of the invention. All equivalents or variations of these embodiments, falling within the spirit and scope of the invention, e.g. an equivalent embodiment of equal variation, are included in the scope of the present invention.

The invention claimed is:

1. A method for extraction of subpixel accuracy edge in photogrammetry, comprising the steps of:
   a. capturing into a computer a picture, of which edges is to be extracted;
   b. defining four neighboring pixels which form a square as one cell;
   c. recognizing the type of each cell composed of the four pixels;
   d. finding out side or sides of a cell that intersects with a part edge, and determining the subpixel accuracy coordinates of the intersection points of the edge and said side or sides by linear interpolation; and
   e. connecting the intersection points, to extract the part edge.

2. The method for extraction of subpixel accuracy edge in photogrammetry according to claim 1, wherein:
   in the cell defined in step b, comparing each pixel with a threshold s, if the pixel is smaller than the threshold s, the pixel is a background pixel; and if the pixel is bigger than or equal to the threshold s, the pixel is a pixel of a part.

3. The method for extraction of subpixel accuracy edge in photogrammetry according to claim 1, wherein:
   in step c, determining which one of 16 situations each cell belongs to, thereby to determine the relationship between the edge and the cell.

4. The method for extraction of subpixel accuracy edge in photogrammetry according to claim 3, wherein:
   in the step d, according to the relationship between the edge and the cell determined in the step c, determining the intersection line of the edge with the cell, thereby to determine the coordinates of the intersection points.

* * * * *